United States Patent [19]

Akutagawa et al.

[11] Patent Number: 5,443,856
[45] Date of Patent: Aug. 22, 1995

[54] METHOD FOR PRODUCING MOLDED CHOCOLATE PRODUCT HAVING COMPLICATED CONCAVED AND CONVEXED DECORATIVE PATTERN THEREON

[75] Inventors: Tokuji Akutagawa; Uichi Otani, both of Tokyo, Japan

[73] Assignee: Akutagawa Confectionery Co., Ltd., Tokyo, Japan

[21] Appl. No.: 260,094

[22] Filed: Jun. 15, 1994

[30] Foreign Application Priority Data

Jun. 24, 1993 [JP] Japan ................... 5-153962

[51] Int. Cl.⁶ ............................................. A23G 1/00
[52] U.S. Cl. ...................................... 426/515; 249/127; 426/660
[58] Field of Search ............... 426/515, 512, 660, 631; 249/127, 129

[56] References Cited

U.S. PATENT DOCUMENTS 4,229,484 10/1980 Steels et al. ................ 426/515
4,588,599 5/1986 Cerboni ....................... 426/515

Primary Examiner—George Yeung
Attorney, Agent, or Firm—Darby & Darby

[57] ABSTRACT

A method for producing a molded chocolate product having a complicated concaved and convexed decorative pattern thereon involves the steps of: (a) charging a low viscosity fluidized chocolate material into a complicated concaved and convexed decorative pattern portion of an elastic mold in bag form for forming the complicated concaved and convexed decorative pattern of the chocolate product so that air bubbles necessarily incorporated into the low viscosity fluidized chocolate material ascend therethrough so as to be removed, (b) charging an ordinarily tempered fluidized chocolate material into the elastic mold to form a main body of the chocolate product, and (c) solidifying the low viscosity fluidized chocolate material and the ordinarily tempered fluidized chocolate material charged into the elastic mold followed by taking the molded chocolate product out of the elastic mold.

6 Claims, 2 Drawing Sheets

METHOD FOR PRODUCING MOLDED CHOCOLATE PRODUCT HAVING COMPLICATED CONCAVED AND CONVEXED DECORATIVE PATTERN THEREON

BACKGROUND OF THE INVENTION

This invention relates to a method for producing a molded chocolate product, and more particularly to a method for producing a molded chocolate product from which air bubbles can be removed especially when producing such a product having a complicated or intricate concaved and convexed decorative pattern at which air bubbles are formed.

A variety of methods for removing air bubbles incorporated into a chocolate material in the chocolate production process have been known. For example, it has been well known to vibrate a chocolate mold into which a fluidized chocolate material having approximately 60,000 centipoises after ordinary tempering is performed is charged. Although in the conventional methods it is possible to remove air bubbles incorporated into the chocolate material charged into a chocolate mold having a simple shape for producing a plate-shaped chocolate product, there arises a problem with such conventional methods in that it is only insufficiently possible to remove air bubbles incorporated into an ordinarily tempered chocolate material having a viscosity of approximately 60,000 centipoises present in complicated concaved and convexed decorative portions formed within a bag shaped elastic mold such as finely shaped decorative portions or inverted tapered decorative portions thereof. The chocolate products having decorative patterns on which air bubbles are present are commercially less valuable or can not be sold depending on the bubbles being formed. Accordingly, with the conventional methods decorative patterns of chocolate products are necessarily simple and limited in designing.

SUMMARY OF THE INVENTION

It is, therefore, an object of the present invention to provide a method for producing a molded chocolate product in which it is possible to readily remove air bubbles incorporated into a chocolate material in complicated concaved and convexed decorative pattern portions of a chocolate mold, the inside of which the complicated patterns such as fine or inverted tapered configurations are formed.

The above and other objects of the invention will become apparent from the following description.

According to the invention, there is provided a method for producing a molded chocolate product having a complicated concaved and convexed decorative pattern thereon comprising the steps of:

(a) charging a low viscosity fluidized chocolate material into a complicated concaved and convexed decorative pattern portion of an elastic mold in bag form for forming the complicated concaved and convexed decorative pattern of the chocolate product so that air bubbles necessarily incorporated into the low viscosity fluidized chocolate material ascend therethrough so as to be removed, (b) charging an ordinarily tempered fluidized chocolate material into the elastic mold to form a main body of the chocolate product, and (c) solidifying the low viscosity fluidized chocolate material and the ordinarily tempered fluidized chocolate material charged into the elastic mold followed by taking the molded chocolate product out of the elastic mold.

BRIEF DESCRIPTION OF THE DRAWINGS

FIG. 3b is a cross-sectional view showing a state in which a high viscosity fluidized chocolate material is charged onto the low viscosity fluidized chocolate material shown in FIG. 3a.

PREFERRED EMBODIMENTS OF THE INVENTION

The preferred embodiments of the present invention will be illustrated with reference to the appended drawings but not limited thereto.

Figure 1:
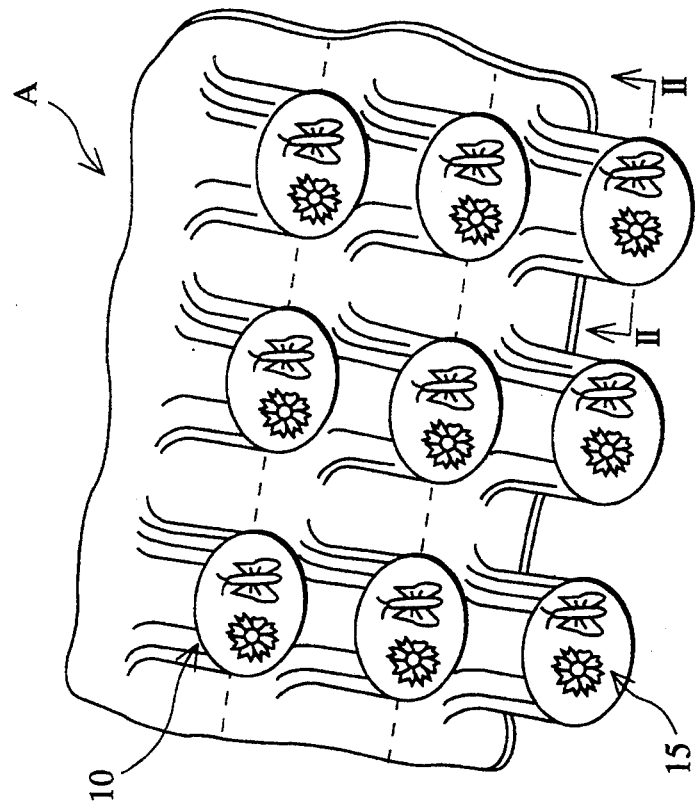
FIG. 1 is a perspective view showing an elastic mold unit employed in the method for producing a mold chocolate product according to the invention.
Figure 2:
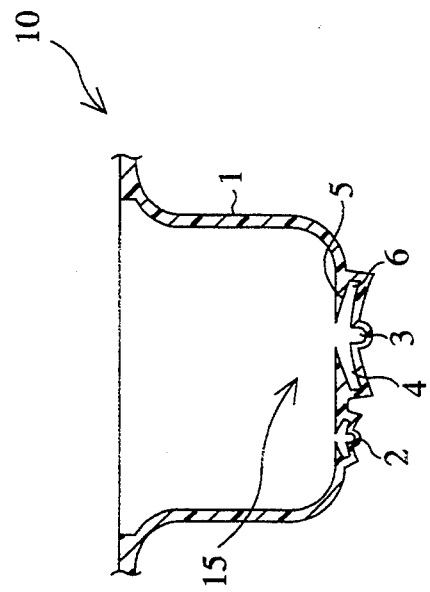
FIG. 2 is a cross-sectional view taken along ling II—II of FIG. 1 and showing a single elastic mold in the form of bag constituting the elastic mold unit shown in FIG. 1.

As shown in FIG. 1 an elastic mold unit A is composed of a plurality of elastic molds 10 each in the form of bag shown in FIG. 2. As shown in FIG. 1, in each inside of the elastic molds 10, complicated concaved and convexed decorative patterns, i.e. a flower and a butterfly in this embodiment are formed although actually not seen so clearly as shown in FIG. 1 from the outside. The elastic mold 10 shown in FIG. 2 is made of elastic silicone and is formed into a generally cylindrical form. The elastic mold 10 has at its bottom portion the flower decorative pattern 2 and the butterfly decorative pattern composed of a body portion 3 and wing portions extending therefrom so as to form inverted tapered portions 5.

In this embodiment, the elastic mold unit A is composed of nine elastic molds 10 each integrally formed with the mold unit A. However, the number of the elastic molds 10 may be changed, while the molds 10 may be separately formed and attached to the unit A.

Referring to FIGS. 3a, 3b, 4a and 4b, a method for producing a molded chocolate product is explained using the elastic mold 10.

Figure 3A:
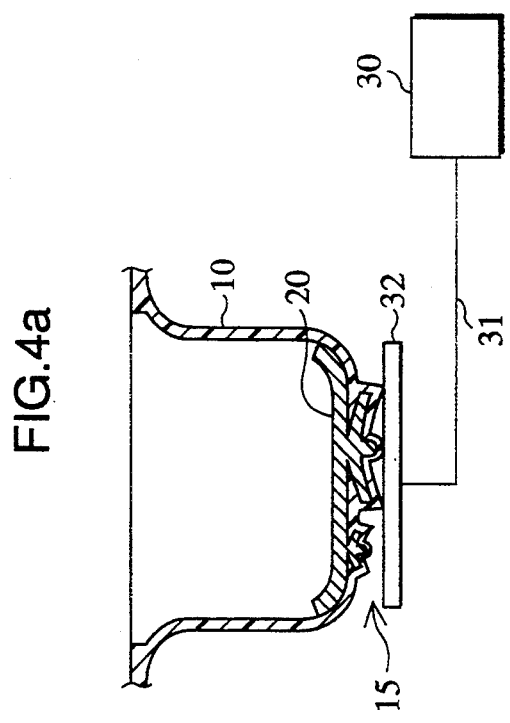
FIG. 3a is a cross-sectional view showing a state in which a low viscosity fluidized chocolate material is charged into complicated concaved and convexed decorative pattern portions of the elastic mold.
Figure 4A:
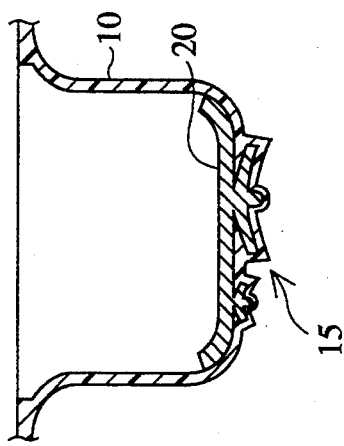
FIG. 4a is an illustrative cross-sectional view showing a state in which the low viscosity fluidized chocolate material is charged into the complicated concaved and convexed decorative pattern portions of the elastic mold, to which vibration is transmitted according to the method of the present invention.

In the step of charging a fluidized chocolate material upon the continuous production line of molded chocolate products, low viscosity fluidized chocolate materials 20 are firstly charged into the respective complicated concaved and convexed decorative pattern portions 15 formed in the lowest portions within each of the elastic molds 10, as shown in FIGS. 3a and 4a. The low viscosity fluidized chocolate material 20 is for example made of non-tempering chocolate which has not been subjected to tempering treatment and may preferably have 5,000 to 10,000 centipoises since air bubbles incorporated may be difficultly removed from chocolate materials having higher viscosity of, for example 20,000 centipoises or larger. The low viscosity fluidized chocolate materials 20 are charged sufficiently into the complicated pattern portions 15 of the mold 10 in such an amount as to generally form the pattern portions 15.

As shown in FIG. 3a, the low viscosity chocolate material 20 may be stationarily left after being charged or may be vibrated, as shown in FIG. 4a, by means of a vibrator 32 actuated through a line 31 from a vibration generator 30 to remove air bubbles incorporated into the chocolate material 20. As shown in FIG. 3a, air bubbles may be removed simply by stationarily leaving the chocolate material 20 as it is since the chocolate material has low viscosity. In order to secure the removal of air bubbles, vibration may be transmitted to the mold 10 as shown in FIG. 4a, thereby further increasing the fluidity of the chocolate material 20 to thus enhance the removal of air bubbles. The vibration generator 30 may be an ultrasonic generator, by means of which air bubbles may be removed effectively.

Figure 3B:
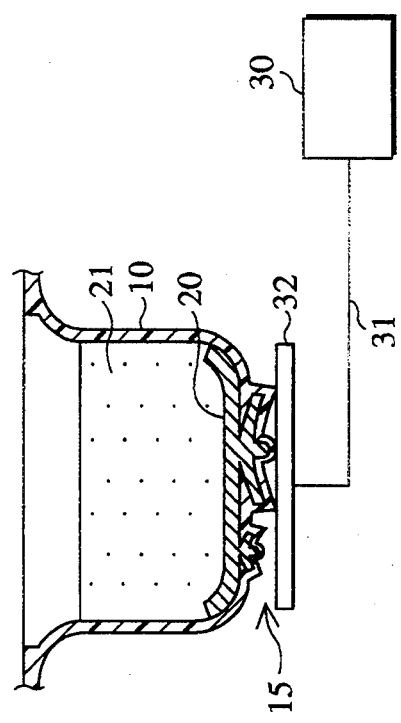
Figure 4B:
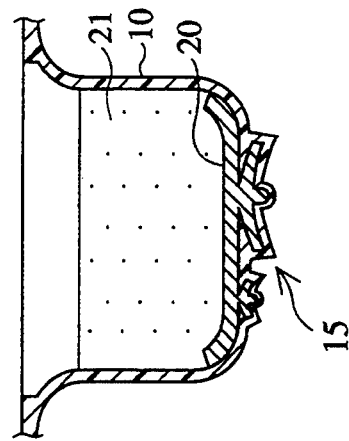
FIG. 4b is an illustrative cross-sectional view showing a state in which the high viscosity fluidized chocolate material is charged onto the low viscosity fluidized chocolate material after having been vibrated according to the present invention.

Next, as shown in FIGS. 3b and 4b, high viscosity fluidized chocolate materials 21 having been subjected to ordinary tempering treatment and having viscosity of preferably 30,000 to 60,000 centipoises and more preferably 30,000 to 40,000 centipoises are charged onto the low viscosity chocolate materials 20, respectively. As shown in FIG. 4b, the vibration generator may be actuated to vibrate the vibrator 32 to remove air bubbles from the chocolate material 21. After the step of charging the chocolate materials 20, 21, the elastic mold unit A is conveyed to a solidifying step (not shown) followed by a demolding step (not shown) to continuously produce molded chocolate products in the usual manner.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for producing a molded chocolate product having a complicated concaved and convexed decorative pattern thereon comprising the steps of:
    (a) charging a low viscosity fluidized chocolate material into a complicated concaved and convexed decorative pattern portion of an elastic mold in bag form for forming said complicated concaved and convexed decorative pattern of said chocolate product so that air bubbles necessarily incorporated into the low viscosity fluidized chocolate material ascend therethrough so as to be removed,
    (b) charging an ordinarily tempered fluidized chocolate material into said elastic mold to form a main body of said chocolate product, and
    (c) solidifying said low viscosity fluidized chocolate material and said ordinarily tempered fluidized chocolate material charged into said elastic mold followed by taking the molded chocolate product out of the elastic mold.

2. The method according to claim 1 wherein said elastic mold into which said low viscosity fluidized chocolate material is charged in said step (a) is vibrated by means of vibrating means.

3. The method according to claim 1 wherein said elastic mold into which said ordinarily tempered fluidized chocolate material is charged in said step (b) is vibrated by means of vibrating means.

4. The method according to claim 2 wherein said vibrating means comprises an ultrasonic vibrator.

5. The method according to claim 3 wherein said vibrating means comprises an ultrasonic vibrator.

6. The method according to claim 1 wherein said low viscosity fluidized chocolate material charged in said step (a) is a non-tempering chocolate material having a viscosity of 5,000 to 10,000 centipoises and wherein said ordinarily tempered fluidized chocolate material charged in said step (b) has a viscosity of 30,000 to 60,000 centipoises.

\* \* \* \* \*